(12) United States Patent
Onodera et al.

(10) Patent No.: US 9,979,516 B2
(45) Date of Patent: May 22, 2018

(54) TRANSMISSION DEVICE THAT PERFORMS MULTI-USER MIMO TRANSMISSION FOR PERFORMING SPATIAL MULTIPLEXING AND TRANSMITTING OF A PLURALITY OF PACKETS ADDRESSED TO A PLURALITY OF RECEPTION DEVICES

(71) Applicants: Sharp Kabushiki Kaisha, Osaka-shi, Osaka (JP); Waseda University, Shinjuku-ku, Tokyo (JP)

(72) Inventors: Takashi Onodera, Osaka (JP); Hiromichi Tomeba, Osaka (JP); Minoru Kubota, Osaka (JP); Fumiaki Maehara, Shinjuku (JP); Fumio Takahata, Shinjuku (JP)

(73) Assignees: SHARP KABUSHIKI KAISHA, Sakai (JP); WASEDA UNIVERSITY, Tokyo (JP)

( * ) Notice: Subject to any disclaimer, the term of this patent is extended or adjusted under 35 U.S.C. 154(b) by 286 days.

(21) Appl. No.: 14/655,749

(22) PCT Filed: Dec. 26, 2013

(86) PCT No.: PCT/JP2013/084926
§ 371 (c)(1),
(2) Date: Jun. 26, 2015

(87) PCT Pub. No.: WO2014/104206
PCT Pub. Date: Jul. 3, 2014

(65) Prior Publication Data
US 2015/0349932 A1 Dec. 3, 2015

(30) Foreign Application Priority Data
Dec. 28, 2012 (JP) .................................. 2012-286640

(51) Int. Cl.
*H04L 5/26* (2006.01)
*H04L 5/00* (2006.01)
(Continued)

(52) U.S. Cl.
CPC ......... *H04L 5/0026* (2013.01); *H04B 7/0452* (2013.01); *H04B 7/0456* (2013.01);
(Continued)

(58) Field of Classification Search
None
See application file for complete search history.

(56) References Cited

U.S. PATENT DOCUMENTS 6,259,991 B1 * 7/2001 Nysen ....................... G01S 7/40
340/10.1
2008/0181285 A1 * 7/2008 Hwang ................. H04B 7/0452
375/148
(Continued)

OTHER PUBLICATIONS

English translation of Official Communication issued in corresponding International Application PCT/JP2013/084926, dated Jul. 9, 2015.
(Continued)

*Primary Examiner* — Christopher Crutchfield
*Assistant Examiner* — Tito Pham
(74) *Attorney, Agent, or Firm* — Keating & Bennett, LLP

(57) ABSTRACT

It is intended to provide a transmission device, a reception device and a communication system capable of improving transmission characteristics by performing packet combining by HARQ in MU-MIMO transmission using non-linear precoding.
In a case of receiving NAK from any of terminal devices (400), a base station device (100) retransmits a packet, in which an error occurs, addressed to this terminal device. The base station device (100) transmits the data to be retransmitted together with other transmission data addressed to a (Continued)

different terminal device or addressed to the own terminal device by spatial multiplexing transmission with MU-MIMO. At this time, for the retransmission data, precoding is performed such that a perturbation term same as a perturbation term which has been added to this data by non-linear precoding at the time of initial transmission is added.

3 Claims, 8 Drawing Sheets

(51) Int. Cl.
| | |
|---|---|
| H04B 7/0456 | (2017.01) |
| H04J 11/00 | (2006.01) |
| H04B 7/06 | (2006.01) |
| H04L 1/18 | (2006.01) |
| H04W 16/28 | (2009.01) |
| H04B 7/0452 | (2017.01) |
| H04L 25/03 | (2006.01) |

(52) U.S. Cl.
CPC ........ *H04B 7/0697* (2013.01); *H04J 11/0033* (2013.01); *H04L 1/1812* (2013.01); *H04L 1/1893* (2013.01); *H04L 25/03898* (2013.01); *H04W 16/28* (2013.01)

(56) References Cited

U.S. PATENT DOCUMENTS

| | | | |
|---|---|---|---|
| 2010/0208837 A1* | 8/2010 | Vetter | H04B 7/0452 375/267 |
| 2010/0232531 A1* | 9/2010 | Nam | H04B 7/0452 375/267 |
| 2012/0140689 A1* | 6/2012 | Pelletier | H04W 76/048 370/311 |

OTHER PUBLICATIONS

Spencer, Q. et al., "An Introduction to the Multi-User MIMO Downlink", IEEE Communications Magazine, vol. 42, No. 10, Oct. 2004, pp. 60-67.

Hochwald, B. et al., "A Vector-Perturbation Technique for Near-Capacity Multiantenna Multiuser Communcation—Part II: Perturbation", IEEE Transactions on Communications, vol. 53, No. 3, Mar. 2005, pp. 537-544.

Mori, H. et al., "A Proposal of Modulo Loss Reduction Method in Vector Perturbation MIMO Broadcast Channel", Society Conference of the Institute of Electronics, Information and Communication Engineers, B-5-40, Sep. 2009, 5 pages.

* cited by examiner

TRANSMISSION DEVICE THAT PERFORMS MULTI-USER MIMO TRANSMISSION FOR PERFORMING SPATIAL MULTIPLEXING AND TRANSMITTING OF A PLURALITY OF PACKETS ADDRESSED TO A PLURALITY OF RECEPTION DEVICES

TECHNICAL FIELD

The present invention relates to a transmission device, a reception device and a communication system, in which a packet transmitted being subjected to precoding in the transmission device is received and error detection of the packet is performed to make an automatic retransmission request.

BACKGROUND ART

As a technology capable of substantially improving frequency usage efficiency, a multiple input multiple output (MIMO) technology for performing radio transmission by using a plurality of transmit and receive antennas is attracting attention and is being put into practical use in a cellular system, a radio LAN system or the like.

A quantity of improvement of the frequency usage efficiency by the MIMO technology is proportional to the number of the transmit and receive antennas. However, the number of the receive antennas which are able to be arranged in a terminal device serving as a reception device is limited. Thus, multi-user MIMO (MU-MIMO) of downlink that a plurality of terminal devices which are connected concurrently are regarded as a virtual large-scale antenna array and transmission signals from a base station device (transmission device) to the terminal devices are subjected to spatial multiplexing is effective for improvement of the frequency usage efficiency.

In the MU-MIMO, the transmission signals addressed to the terminal devices are received by the terminal devices as inter-user-interference (hereinafter, referred to as IUI), so that it is desired to suppress the IUI. For example, in LTE or LTE-Advanced, linear precoding is adopted that a linear filter which is calculated based on channel information notified by each terminal device is multiplied by a transmission signal in advance at a base station device to thereby suppress the IUI.

However, unless orthogonality of channels of the terminal devices which are subjected to spatial multiplexing is high, the IUI is not able to be suppressed effectively, so that there is a limit on the improvement of the frequency usage efficiency in MU-MIMO using the linear precoding (linear MU-MIMO).

Thus, these days, an MU-MIMO technology using non-linear precoding (non-linear MU-MIMO) that non-linear processing is performed on a side of a base station device is attracting attention.

In a case where modulo (residue) operation is possible in a terminal device, it becomes possible to add a perturbation vector with a complex number (perturbation term) obtained by multiplying an arbitrary Gaussian integer by a certain real number as an element to a transmission signal. Thus, by appropriately setting the perturbation vector according to a channel state between the base station device and a plurality of terminal devices to generate a transmission signal, even if the orthogonality of channels of the terminal devices which are subjected to spatial multiplexing is not high, it is possible to substantially reduce desired transmission power and to significantly improve transmission efficiency compared to the linear precoding in which a perturbation vector is not added (NPLs 1 and 2).

However, the non-linear precoding has a problem that in a case where a signal to noise power ratio (SNR) or a carrier to noise power ratio (CNR), a signal to interference plus noise power ratio (SINR) or a carrier to interference plus noise power ratio (CINR) is low, characteristic degradation called modulo-loss is caused that a reception signal point is detected as an erroneous signal point as a result of modulo operation which is performed on a reception side for one received over a border line of the modulo operation due to noise, inter-cell-interference or the like (NPL 3)

Moreover, one error control technology in packet transmission includes an automatic repeat request (ARQ). The ARQ is a scheme in which, in a case where error detection coding, for example, cyclic redundancy check (CRC) coding or the like is added to information data on a transmission side for transmission and an error is detected on a reception side, retransmission of this data is requested to the transmission side. With the ARQ, redundancy of coding is small and high reliability is achieved with relatively simple processing, but retransmission occurs frequently if the error is increased and transmission efficiency is rapidly reduced.

Another error control technology includes (forward) error correction (FEC). The FEC is a scheme in which error correction is performed by applying error correction cording for adding redundancy (parity data) to information data on a transmission side and performing error correction decoding on a reception side.

Further, in a recent radio communication system, a hybrid ARQ (HARQ) scheme in which the ARQ and the FEC are combined is being put into practical use.

In the HARQ scheme, error correction coding is performed and further a packet to which error detection coding is added is transmitted on the transmission side and error detection is performed after error correction decoding on a reception side, and in the case where an error is detected, retransmission is requested to the transmission side. The HARQ is roughly classified into a type-I in which a packet same as a previous one is transmitted at the time of retransmission and combining is performed on the reception side to thereafter perform error correction decoding again and a type-II in which different parity data regarding a previous packet is transmitted at the time of retransmission, and is combined with the previous packet on the reception side to improve redundancy, and then error correction decoding is performed. One example of the type-I includes a chase combining (CC) type and one example of the type-II includes an incremental redundancy (IR) type.

CITATION LIST

Non Patent Literature

NPL 1: Spencer et al., "An Introduction to the Multi-User MIMO Down Link", IEEE Communication Magazine, Vol. 42, Issue 10, pp. 60-67, October 2004

NPL 2: B. M. Hochwald et al., "A vector-perturbation technique for near-capacity multiantenna multiuser communication-Part II: Perturbation", IEEE Trans. Commun., Vol. 53, No. 3, pp. 537-544, March 2005

NPL 3: Mori et al., "A proposal of an error reduction method of modulo operation in MIMO Broadcast Channel using Vector Perturbation", Society Conference 2009 of the Institute of Electronics, Information and Communication Engineers, B-5-40, September 2009

SUMMARY OF INVENTION

Technical Problem

In a case where a reception error occurs in MU-MIMO transmission using the non-linear precoding and retransmission by HARQ is performed, if packet combining of a chase combining type is performed by using a signal after modulo operation in a reception device, there is a problem that correct packet combining is not able to be realized because of influence of modulo-loss associated with modulo operation.

On the other hand, in a case where the packet combining of the chase combining type is performed by using a signal before modulo operation in the reception device, there is a problem that because of influence of independent perturbation vectors being added at the time of initial transmission and at the time of retransmission, the perturbation vectors are not able to be removed correctly in the modulo operation and characteristic is degraded.

In view of such circumstances, the present invention is for providing a transmission device, a reception device and a communication system capable of improving transmission characteristics by performing packet combining by HARQ in MU-MIMO transmission using non-linear precoding.

Solution to Problem

The present invention provides a transmission device that performs multi-user MIMO transmission for performing spatial multiplexing and transmitting of a plurality of packets addressed to a plurality of reception devices by suppressing inter-user interference with non-linear precoding in advance, comprising: a channel information acquisition unit that acquires channel information notified from each of the reception devices; and a precoder that performs non-linear precoding for respectively adding a perturbation term to each of modulated symbols of each of the packets based on the channel information, characterized in that in a case where each of the packets is a retransmission packet, the precoder uses a perturbation term which is added to each of the modulated symbols at the time of initial transmission of each of the packets as the perturbation term to be added to each of the modulated symbols of each of the packets.

Here, it is characterized in that, in the transmission device of the present invention, the precoder, in a case where each of the packets is a retransmission packet and a processing order in the non-linear precoding is a predefined threshold or less, uses the perturbation term which is added to each of the modulated symbols at the time of initial transmission of each of the packets as the perturbation term to be added to each of the modulated symbols of each of the packets, and in a case where each of the packets is a retransmission packet and the processing order in the non-linear precoding is larger than the predefined threshold, obtains the perturbation term to be added to each of the modulated symbols of each of the packets based on the channel information.

Moreover, the present invention provides a transmission device that performs multi-user MIMO transmission for performing spatial multiplexing and transmitting of a plurality of packets addressed to a plurality of reception devices by suppressing inter-user interference with non-linear precoding in advance, including: a channel information acquisition unit that acquires channel information notified from each of the reception devices; a scheduler that determines a redundancy version for defining rate matching processing of each of the packets; an error correction encoder that performs error correction cording of transmission data sequences of each of the packets to generate coding bit sequences, and performs rate matching processing for the coding bit sequences based on the redundancy version; a modulator that performs modulation for each of the coding bit sequences after the rate matching to generate modulated symbol sequences; a precoder that performs non-linear precoding for respectively adding a perturbation term to each of the modulated symbols based on the channel information; and a control information generator that generates control information for notifying each of the reception devices of the redundancy version, characterized in that the precoder determines the perturbation term to be added to the modulated symbols based on the redundancy version.

Here, it is characterized in that, in the transmission device of the present invention, the precoder, in the case where each of the packets is a retransmission packet, uses a perturbation term which is added to each of the modulated symbols at the time of initial transmission or at the time of past retransmission of each of the packets which are transmitted with a redundancy version same as the redundancy version as the perturbation term to be added to the modulated symbols.

Moreover, the present invention provides a reception device that receives a packet transmitted being applied with non-linear precoding in a transmission device and performs error detection of the received packet for performing an automatic retransmission request, including: a channel estimator that estimates a channel state between the transmission device and own terminal device; a channel compensator that performs channel compensation for a received symbol of the received packet based on a channel state estimation result in the channel estimator; a reception buffer that stores the received symbol subjected to channel compensation at the channel compensator; and a packet combiner that performs combining processing of the received packet, characterized in that in a case where the received packet is a retransmission packet, the packet combiner combines a channel-compensated received symbol of the received packet, and a channel-compensated received symbol at the time of initial transmission and a channel-compensated received symbol at the time of past retransmission of the packet, which are stored in the reception buffer, and performs modulo operation for a combining result.

Here, it is characterized in that, in the reception device of the present invention, a control information acquisition unit that receives a redundancy version notified from the transmission device is further included, and the reception buffer stores the redundancy version with the received symbol subjected to channel compensation at the channel compensator, and, in the case where the received packet is a retransmission packet, the packet combiner combines the channel-compensated received symbol of the received packet, and the channel-compensated received symbol at the time of initial transmission and the channel-compensated received symbol at the time of past retransmission of the packet, which are stored in the reception buffer with a redundancy version same as the redundancy version of the received packet, and performs modulo operation for the combining result.

Moreover, the present invention provides a communication system including a transmission device that performs multi-user MIMO transmission for performing spatial multiplexing and transmitting of a plurality of packets addressed to a plurality of reception devices by suppressing inter-user interference with non-linear precoding in advance, and the plurality of reception devices that receive the packets and perform error detection for performing an automatic repeat request, characterized in that the transmission device acquires channel information notified from each of the reception devices, and at the time of performing non-linear precoding for respectively adding a perturbation term to each of modulated symbols of each of the packets based on the channel information, in a case where each of the packets is a retransmission packet, uses a perturbation term which is added to each of the modulated symbols at the time of initial transmission of each of the packets as the perturbation term to be added to each of the modulated symbols of each of the packets, and the reception device estimates a channel state between the transmission device and own terminal device, performs channel compensation for a received symbol of the received packet based on an estimation result of the channel state, stores the received symbol subjected to channel compensation in a reception buffer, and, in a case where the received packet is a retransmission packet, combines a channel-compensated received symbol of the received packet, and a channel-compensated received symbol at the time of initial transmission and a channel-compensated received symbol at the time of past retransmission of the received packet, which are stored in the reception buffer, and performs modulo operation for a combining result.

Advantageous Effects of Invention

According to the present invention, an excellent effect that transmission characteristics is able to be improved by packet combining is able to be exerted in a case where HARQ is applied in MU-MIMO transmission using non-linear precoding.

DESCRIPTION OF EMBODIMENTS

Description will hereinafter be given for a communication technology according to embodiments of the present invention with reference to drawings.

First Embodiment

In a communication technology according to the present embodiment, with respect to a plurality of reception devices (terminal devices), a transmission device (base station device) performs MU-MIMO transmission for transmitting transmission data addressed to these plurality of reception devices simultaneously by performing spatial multiplexing. Description will be given by taking, as an example, a communication system in which the transmission device performs the transmission at this time by applying signal processing for suppressing in advance inter-user interference (IUI) which is caused between signals (streams) addressed to each of the reception devices by non-linear precoding to the transmission data.

Figure 1:
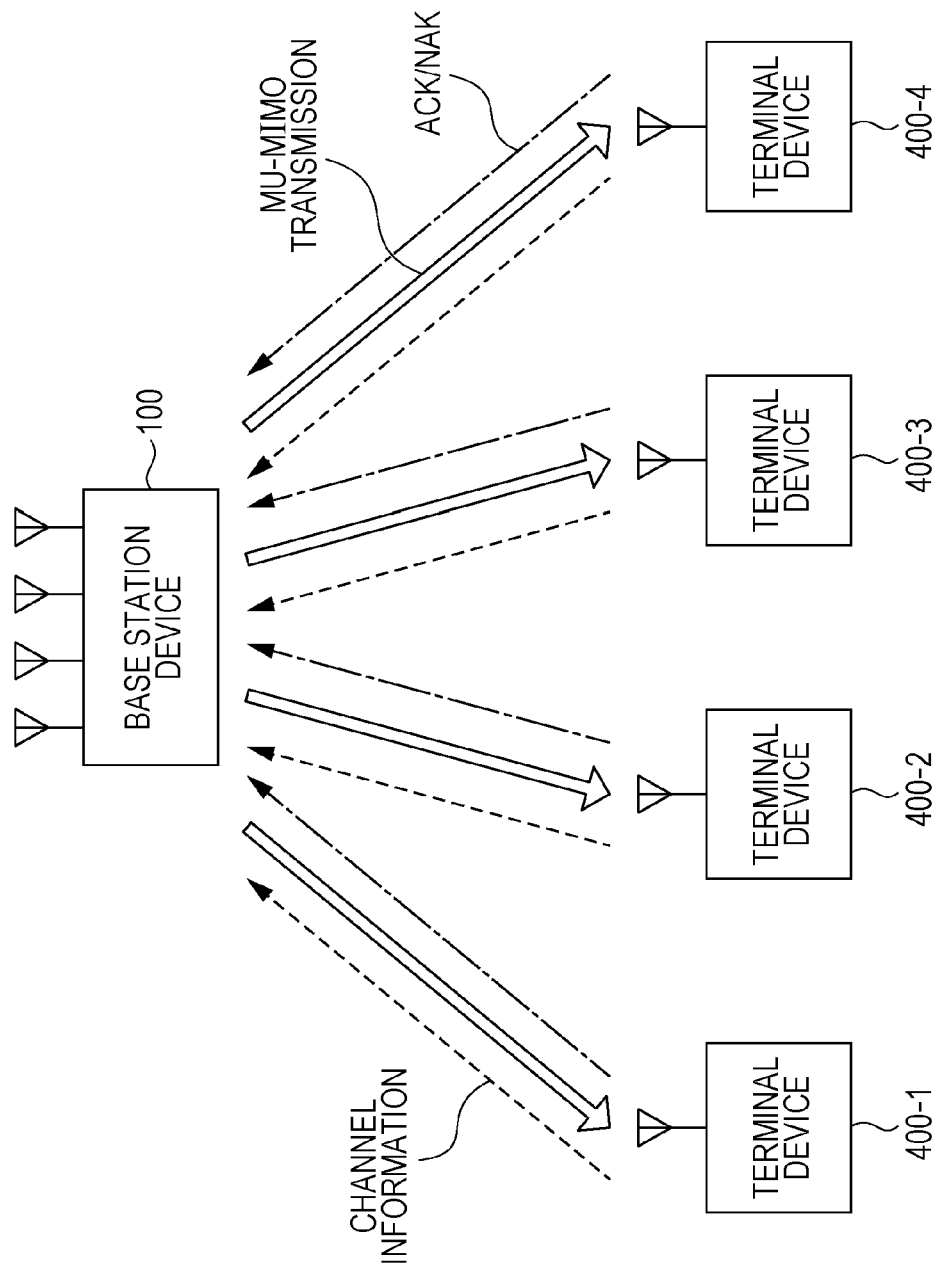
FIG. 1 is a schematic configuration view showing one example of a communication system in an embodiment of the present invention.

FIG. 1 is a schematic configuration view showing one example of a communication system in the embodiment of the present invention.

The communication system in the example of FIG. 1 is configured by a base station device 100 which is a transmission device for MU-MIMO transmission, and a plurality of terminal devices (for example, terminal devices 400-1 to 400-4, and the terminal devices 400-1 to 400-4 are also represented together as terminal devices 400) which are reception devices. Description will be given below in the present embodiment by taking, as an example, a case where the base station device 100 includes M antennas and the terminal devices 400-1 to 400-4 each including one antenna are selected as U users targeted for MU-MIMO transmission (U=4), and transmission data sequences addressed to each of these terminal devices are subjected to MU-MIMO multiplexing one by one.

Each of the terminal devices 400-1 to 400-4 estimates a channel state between the base station device 100 and own terminal device based on a reference signal or the like transmitted from the base station device 100, and notifies the base station device 100 of channel information representing the estimation result. Note that, description will be given in the present embodiment by taking, as an example, a case where each of the terminal devices 400 includes one antenna and channel state information (CSI) representing a complex channel gain between each antenna of the base station device 100 and the antenna of each of the terminal devices 400 is used as the channel information, but without limitation thereto, for example, information representing a complex channel gain between each antenna of the base station device 100 and one or more antennas of each of the terminal devices 400, a covariance value thereof or the like, a precoding matrix obtained from a channel state, a desired precoding matrix index (PMI), or the like may be used.

The base station device 100 applies precoding to transmission data addressed to each of the terminal devices 400-1 to 400-4 by non-linear precoding based on the channel information notified from each of the terminal devices 400-1 to 400-4 to perform spatial multiplexing transmission by MU-MIMO.

Each of the terminal devices 400-1 to 400-4 performs channel compensation, modulo operation, demodulation (demapping) and error correction decoding and then error detection for a received packet (block of data) addressed to the own terminal device. The base station device 100 is notified of an acknowledgement response (Acknowledgement: ACK) in a case where the packet is able to be received without error and of a non-acknowledgment response (Nonacknowledgement: NAK or NACK) when there is an error. Moreover, as to the packet in which an error occurs, a channel-compensated symbol sequence thereof is stored in a reception buffer.

In a case of receiving the NAK from any of the terminal devices 400, the base station device 100 resends (retransmits) the packet (frame), in which the error occurs, addressed to this terminal device. The base station device 100 transmits data to be retransmitted together with other transmission data addressed to a different terminal device or addressed to this terminal device by spatial multiplexing transmission with MU-MIMO. At this time, for the retransmission data, precoding is performed such that a perturbation term (element of perturbation vector) same as a perturbation term which has been added (appended) to this data by non-linear precoding at the time of initial transmission is added. Note that, the data subjected to spatial multiplexing may include retransmission data addressed to a different terminal device.

The terminal device 400 which has received the retransmission packet combines a symbol of a channel compensation result for the received retransmission packet and a symbol of a channel compensation result for past packets (an initial transmission packet, and all past retransmission packets in a case where the retransmission is of the second time and thereafter) stored in the reception buffer, and performs modulo operation, demodulation and error correction decoding for a combining result. Then, error detection is performed, and based on a result thereof, the ACK or the NAK is notified to the base station device 100 in the same manner as previous time. Further, in a case where an error is detected, a channel-compensated symbol sequence of the current retransmission packet is added and stored in the reception buffer.

Thereafter, processing subsequent to the retransmission processing by the base station device 100 is repeated until no error is detected or until the number of times of retransmission reaches a predefined upper limit value.

Figure 2:
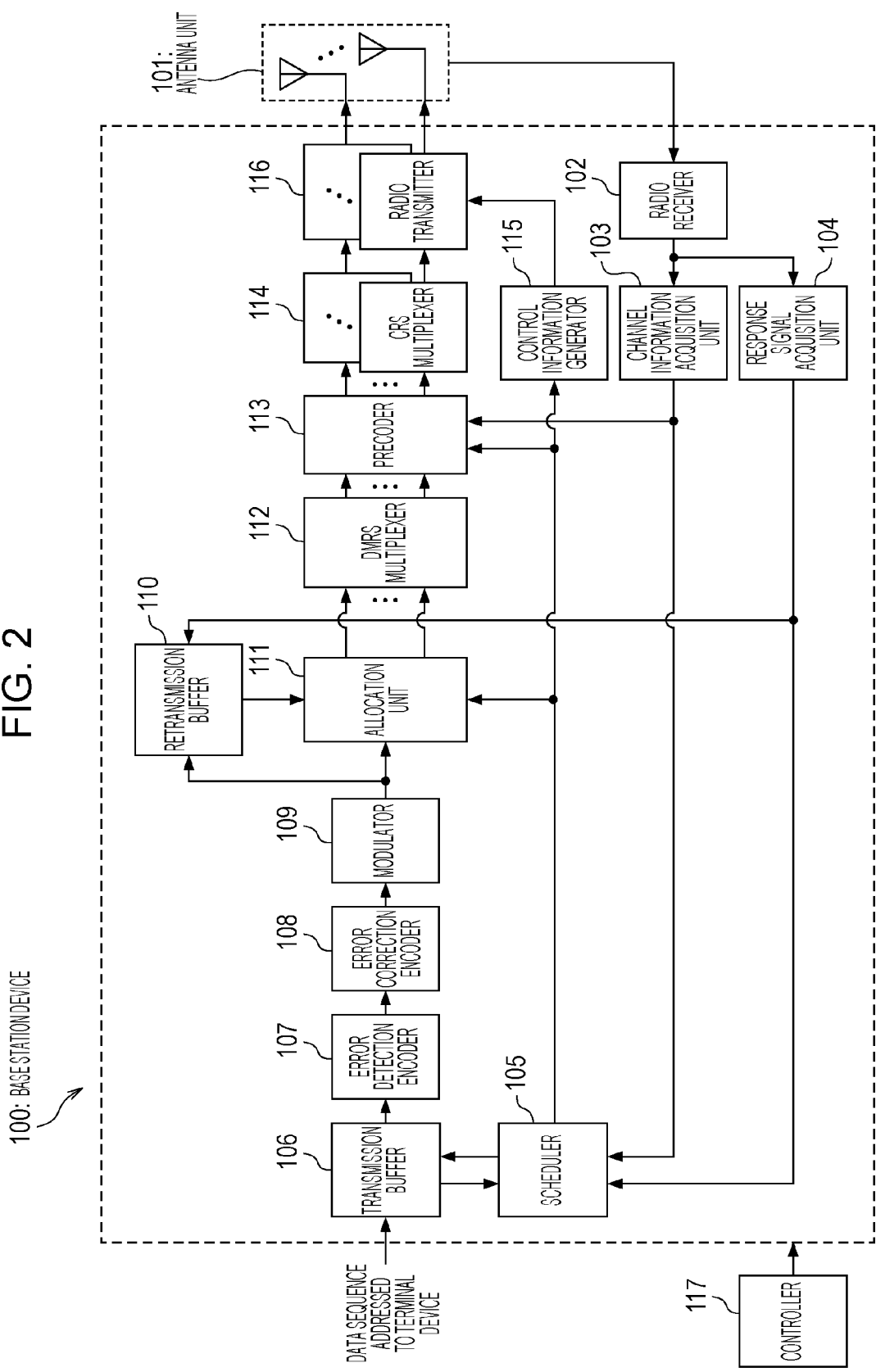
FIG. 2 is a functional block diagram showing one configuration example of a base station device of a first embodiment of the present invention.

FIG. 2 is a functional block diagram showing one configuration example of the base station device 100 of the present embodiment.

In the configuration example of the base station device 100 of FIG. 2, M antennas are included in an antenna unit 101 and MIMO transmission is able to be performed by performing spatial multiplexing for up to U different transmission data sequences. Note that, it is set that M=U=4 in the following description.

A radio receiver 102 receives a signal transmitted from each of the terminal devices 400 through at least one antenna of the antenna unit 101.

A channel information acquisition unit 103 acquires, from the received signal, CSI which is transmitted by each of the terminal devices 400.

A response signal acquisition unit 104 acquires, from the received signal, the ACK or the NAK which is transmitted by each of the terminal devices 400 correspondingly to the packet transmitted by the base station device 100.

A scheduler 105 selects terminal devices to be multiplexed by MU-MIMO and data or retransmission packets to be transmitted by them based on an amount of transmission data addressed to each terminal device which is accumulated in a transmission buffer 106; QoS (Quality of Service) information such as priority and allowable delay time; the CSI from each of the terminal devises 400, which is acquired by the channel information acquisition unit 103; the NAK (or retransmission request) acquired by the response signal acquisition unit 104; and the like. Moreover, an identification number is newly applied to transmission data of initial transmission (initial transmission packet). Further, parameters such as a modulation scheme and a coding rate (Modulation and Coding Scheme: MCS) with respect to the transmission data of initial transmission may be selected based on the CSI from each of the terminal devices 400-1 to 400-4, channel quality indicator (CQI) which is acquired separately, or the like. In addition, the above result is output as scheduling information.

The transmission buffer 106 accumulates a transmission data sequences addressed to each terminal device, which is input from a higher layer, and outputs each of the transmission data sequences addressed to the terminal device which is selected by the scheduler 105 to an error detection encoder 107.

The error detection encoder 107 performs error detection coding respectively for each of the transmission data sequences input from the transmission buffer 106. For example, parity coding, check sum, cyclic coding or the like is used. Description will be given in the present embodiment by taking a case where cyclic redundancy check (CRC) which is one of the cyclic coding is used as an example. Moreover, it may be configured so that a plurality of error detection encoders are included for performing error detection coding of the transmission data sequences addressed to each of the terminal devices in a parallel manner.

An error correction encoder 108 performs error correction coding respectively for each of the transmission data sequences to which the error detection coding is added and which is input from the error detection encoder 107. Note that, in a case where a coding rate of the transmission data sequences addressed to each terminal device is selected in the scheduler 105, rate matching (puncture) is performed in accordance with the coding rate. In a case where no coding rate is specified, the rate matching is preferably performed with a predefined coding rate. Moreover, it may be configured so that a plurality of error correction encoders are included for performing error correction coding of each of the transmission data sequences to which the error detection coding is added in a parallel manner.

A modulator 109 performs modulation for the transmission data sequences respectively subjected to error correction coding to output modulated symbol sequences. Note that, in a case where a modulation scheme of the transmission data addressed to each terminal device is selected in the scheduler 105, the modulation is performed by using the modulation scheme. In a case where no modulation scheme is specified, the modulation is preferably performed with a predefined modulation scheme. Moreover, it may be configured so that a plurality of modulators are included for modulating each of the transmission data sequences subjected to error correction coding in a parallel manner.

A retransmission buffer 110 stores each of the modulated symbol sequences generated by the modulator 109. Moreover, based on input of the acknowledgement response from the response signal acquisition unit 104, the stored modulated symbol sequence of the corresponding packet is deleted.

Based on a result of the scheduling in the scheduler 105, an allocation unit 111 allocates each of the modulated symbol sequences (of initial transmission packet) output by the modulator 109 and the modulated symbol sequences of a retransmission packet stored in the retransmission buffer 110, which are to be subjected to MU-MIMO multiplexing, to each of M space resources (streams) of MU-MIMO.

A DMRS multiplexer 112 multiplexes demodulation reference signals (DMRSs) which are known symbols to be referred to for performing channel compensation and demodulation of a received signal in each of the terminal devices 400 respectively with each of the modulated symbol sequences. Note that, the multiplexed DMRSs are subjected to precoding in the precoder 113 in the same manner as the modulated symbol sequences. However, the precoding of the DMRSs is preferably performed as precoding such that addition (modulo operation) of a perturbation vector is not performed and only a transmission filter described below is multiplied. Moreover, in the multiplexing of the modulated symbol sequences and the DMRSs, for example, the multiplexing may be performed in time division, or the multiplexing may be performed in frequency division so as to perform division with subcarriers in the case of multi-career transmission. Further, each of the DMRSs for each terminal device is preferably multiplexed respectively so as to be received in a form capable of being identified independently by using mutually different times, frequencies, coding and the like.

Upon input of U modulated symbol sequences (modulated symbol sequences 1 to U) multiplexed with the DMRSs, the precoder 113 applies non-linear precoding to each of the input modulated symbols based on the CSI of each of the terminal devices 400, which is acquired at the channel information acquisition unit 103, and generates precoded symbol sequences (precoded symbol sequences 1 to M) for each antenna of the antenna unit 101 used for the transmission. Note that, the precoder 113 will be described specifically below.

A CRS multiplexer 114 multiplexes common reference signals (CRSs) which are known symbols to be referred to for estimating a channel state between each antenna of the antenna unit 101 of the base station device 100 and the antenna of each terminal device in each of the terminal devices 400 with each of the precoded symbol sequences of each antenna. Note that, precoding is not applied to the multiplexed CRSs. Moreover, in the multiplexing of the precoded symbol sequences and the CRSs, for example, the multiplexing may be performed in time division, or the multiplexing may be performed in frequency division so as to perform division with subcarriers in the case of multi-career transmission. Further, each of the CRSs transmitted from each antenna of the base station device 100 is preferably multiplexed respectively so as to be received in a form capable of being identified independently in the antenna of each of the terminal devices 400 by using mutually different times, frequencies, coding or the like.

Based on the scheduling information, a control information generator 115 generates control information including resource allocation, an identification number for identifying packets to be transmitted (retransmission packet has same identification number as the case of initial transmission), information representing whether each packet is of initial transmission or retransmission, the MCS of each packet, and the number of spatial streams of each terminal device.

A radio transmitter 116 transmits the precoded symbol sequences multiplexed with the CRSs and the control information through each antenna of the antenna unit 101.

A controller 117 controls each of the aforementioned units to cause each processing to be executed.

Figure 3:
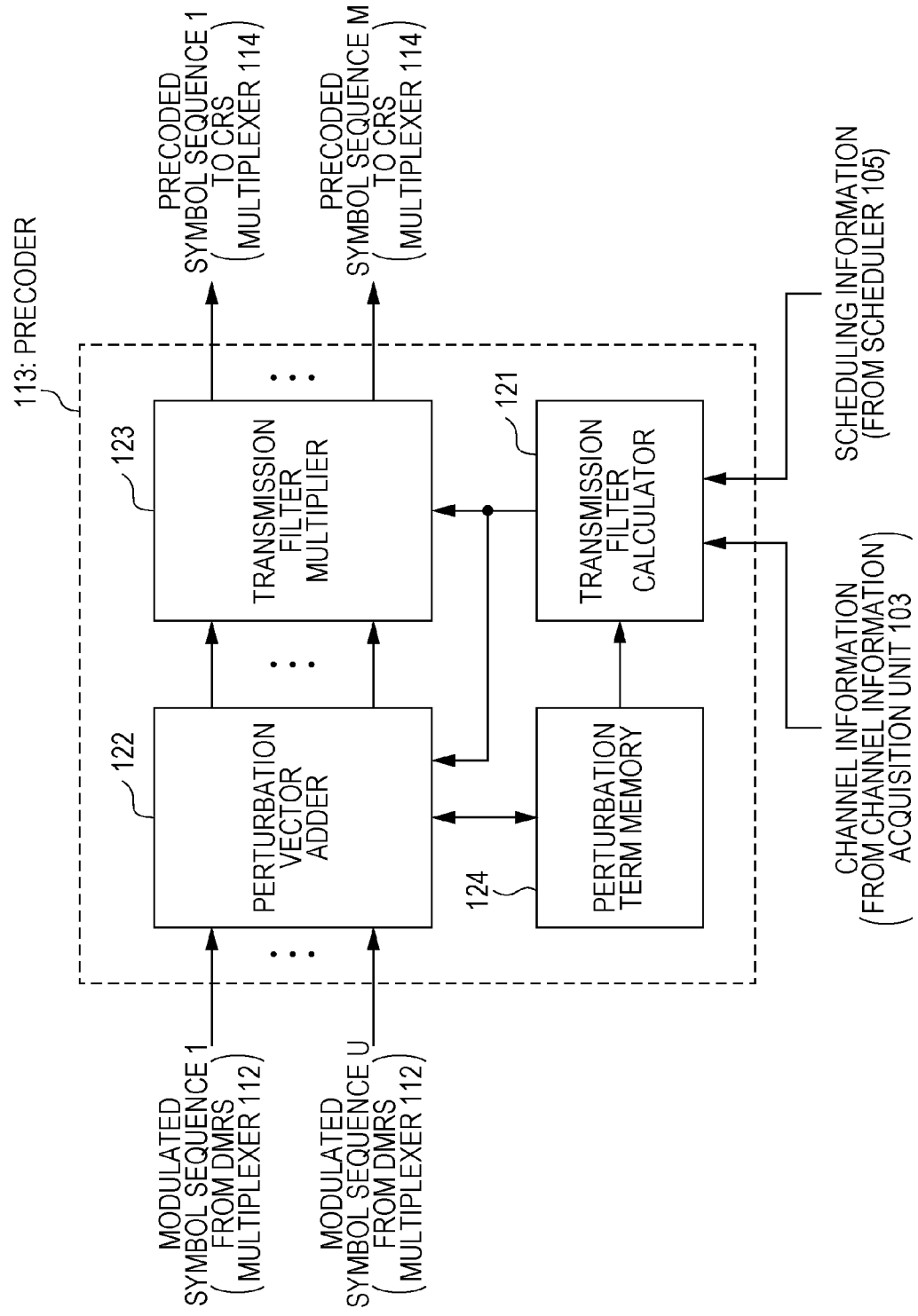
FIG. 3 is a functional block diagram showing one configuration example of a precoder in the base station device of the first embodiment of the present invention.

FIG. 3 is a functional block diagram showing one configuration example of the precoder 113 in the base station device 100 of the present embodiment.

A transmission filter calculator 121 calculates a transmission filter $W_{TX}$ based on the CSI which is input from the channel information acquisition unit 103 and notified from each of the terminal devices 400, and the scheduling information which is input from the scheduler 105 (such as information of the terminal devices 400, to be subjected to spatial multiplexing, corresponding to the modulated symbol sequences 1 to U input from the DMRS multiplexer 112, and information as to whether each of the modulated symbol sequences is of the initial transmission packet or the retransmission packet).

For example, it is configured that as the CSI of terminal devices 400-$u$ ($u$=1 to U), $h_u$ with each complex channel gain $h_{u,i}$ ($i$=1 to M) between M antennas of the base station device 100 and an antenna of the terminal devices 400-$u$ as an element is notified to the base station device 100.

[Expression 1]

$$h_u = [h_{u,1}\ h_{u,2}\ \ldots\ h_{u,M}] \quad (1)$$

At this time, a channel matrix H between the M antennas of the base station device 100 and total U (=M) pieces of the terminal devices 400, which is obtained in the base station device 100, is as shown in a formula (2).

[Expression 2]

$$H = \begin{bmatrix} h_1 \\ \vdots \\ h_U \end{bmatrix} = \begin{bmatrix} h_{1,1} & \cdots & h_{1,M} \\ \vdots & \ddots & \vdots \\ h_{U,1} & \cdots & h_{U,M} \end{bmatrix} \quad (2)$$

As shown in a formula (3), a transmission filter $W_{TX(ZF)}$ is obtained based on this channel matrix H by zero-forcing (ZF) norm so that, for example, all inter-user interference is suppressed at the time of reception in each of the terminal devices 400.

[Expression 3]

$$W_{TX(ZF)} = H^H(HH^H)^{-1} \quad (3)$$

Here, superscript H represents Hermitian transpose of a matrix. Moreover, as shown in a formula (4), a transmission filter $W_{TX(MMSE)}$ which is obtained, for example, by minimum mean square error (MMSE) norm by which an average ratio of reception signal power to interference-and-noise power (Signal to Interference plus Noise power Ratio: SINR) is maximized is obtained.

[Expression 4]

$$W_{TX(MMSE)} = H^H(HH^H + \alpha I)^{-1} \quad (4)$$

Here, I is an identity matrix. Moreover, $\alpha$ represents a normalization coefficient, and in a case where it is set as $P_S$ by assuming a case where the average transmission signal power to each terminal device is equal and as $P_n$ by assuming a case where the noise power in each terminal device is equal, $\alpha = P_n/P_S$ is met. Note that, description will be given below by taking a case where $W_{TX(ZF)}$ is used as the transmission filter $W_{TX}$ as an example.

In the case of linear precoding, the transmission filter $W_{TX}$ which is obtained as described above is multiplied by the modulated symbol sequences 1 to U which are input from the DMRS multiplexer 112. Further, a normalization coefficient $g^{-1}$ for normalizing transmission power is multiplied. In a case where a symbol which is allocated to time t of a modulated symbol sequence u ($u$=1 to U) is set as $s_u(t)$, and $s(t)=[s_1(t), \ldots, s_u(t)]^T$ (superscript T represents transpose) is met, the precoded symbol sequence x(t) in the case of the linear precoding=$[x_1(t), \ldots, x_M(t)]^T$ is as shown in a formula (5). Note that, display of time (t) will be omitted for simplification below.

[Expression 5]

$$x = \begin{bmatrix} x_1 \\ \vdots \\ x_M \end{bmatrix} = g^{-1}W_{TX}s = g^{-1}W_{TX}\begin{bmatrix} s_1 \\ \vdots \\ s_U \end{bmatrix} \quad (5)$$

Here, $g^{-1}$ is a transmission power normalization coefficient for normalizing transmission power (making average transmission power after precoding fixed) and is obtained by a formula (6).

[Expression 6]

$$g^{-1} = \sqrt{\frac{E_{tr}}{tr(W_{TX}C_v W_{TX}^H)}} \quad (6)$$

Here, $E_{tr}$ indicates a total transmission signal power from all the antennas of the base station device 100, and $C_v$ indicates a covariance matrix of a transmission signal, and tr(A) represents trace operation of a matrix A. Note that, in a case where the average transmission signal power to each of the terminal devices 400 is equal in the linear precoding, $C_v=P_s I$ is met.

On the other hand, in the non-linear precoding, with respect to the modulated symbol sequences 1 to U which are input from the DMRS multiplexer 112, precoding is performed by adding a perturbation vector to a modulated symbol s based on the CSI notified from each of the terminal devices 400.

For example, in a case where the non-linear precoding using a vector perturbation (VP) is performed, first, in the same manner as the linear precoding, the transmission filter calculator 121 obtains the transmission filter $W_{TX}$ with the formula (3) or the formula (4) based on a channel matrix H obtained from the channel information which is notified from each of the terminal devices 400.

A perturbation vector adder 122 adds a perturbation vector $2MZ=2M[z_1, \ldots, z_U]^T$ to the modulated symbol s.

[Expression 7]

$$s' = s + 2MZ = \begin{bmatrix} s_1 \\ \vdots \\ s_U \end{bmatrix} + 2M\begin{bmatrix} z_1 \\ \vdots \\ z_U \end{bmatrix} \quad (7)$$

Here, 2M is a modulo width and is a constant of a real number which is predefined for each modulation scheme. Moreover, $z_1$ to $z_U$ are celled perturbation terms each of which is an arbitrary Gaussian integer (complex number in which a real part and an imaginary part are respectively integers). With the VP, Z which satisfies a formula (8) is searched for to be used by using search algorithm, for example, such as Sphere Encoder described in NPL 2.

[Expression 8]

$$Z = \underset{Z \in Z_G}{\operatorname{argmin}} \|W_{TX}s'\|^2 = \underset{Z \in Z_G}{\operatorname{argmin}} \|W_{TX}(s+2MZ)\|^2 \quad (8)$$

Here, $Z_G$ represents a set of the entire Gaussian integer vectors.

However, in the present embodiment, the perturbation term same as one obtained at the time of initial transmission is added to the modulated symbol of retransmission packets. Therefore, for the perturbation term corresponding to the retransmission packets among respective perturbation terms which are elements of the perturbation vector obtained by the perturbation vector adder 122, the perturbation term corresponding to the packet obtained at the time of initial transmission, which is stored in a perturbation term memory 124, is read and used. Under the condition that the perturbation term corresponding to these retransmission packets is fixed to a value read from the perturbation term memory 124, the perturbation vector adder 122 determines the perturbation term corresponding to the remaining packets so as to satisfy the formula (8) and obtains the perturbation vector 2MZ.

The perturbation vector adder 122 outputs the perturbation term corresponding to the initial transmission packet obtained as described above to the perturbation term memory 124.

The perturbation term memory 124 stores the perturbation term corresponding to the initial transmission packet, which is output from the perturbation vector adder 122. Note that, it may be configured so that the perturbation term is stored in the retransmission buffer 110 with the modulated symbol sequence of the initial transmission packet.

A transmission filter multiplier 123 multiplies an addition result of the perturbation vector output from the perturbation vector adder 122 by the transmission filter $W_{TX}$ calculated at the transmission filter calculator 121, which is further multiplied by the transmission power normalization coefficient $g^{-1}$ to calculate a precoded symbol sequence x for outputting as precoded symbol sequences 1 to M.

[Expression 9]

$$x = g^{-1}W_{TX}s' \quad (9)$$

Note that, the transmission power normalization coefficient $g^{-1}$ is obtained with the formula (6) based on a modulated symbol s' after addition of the perturbation vector.

Figure 4:
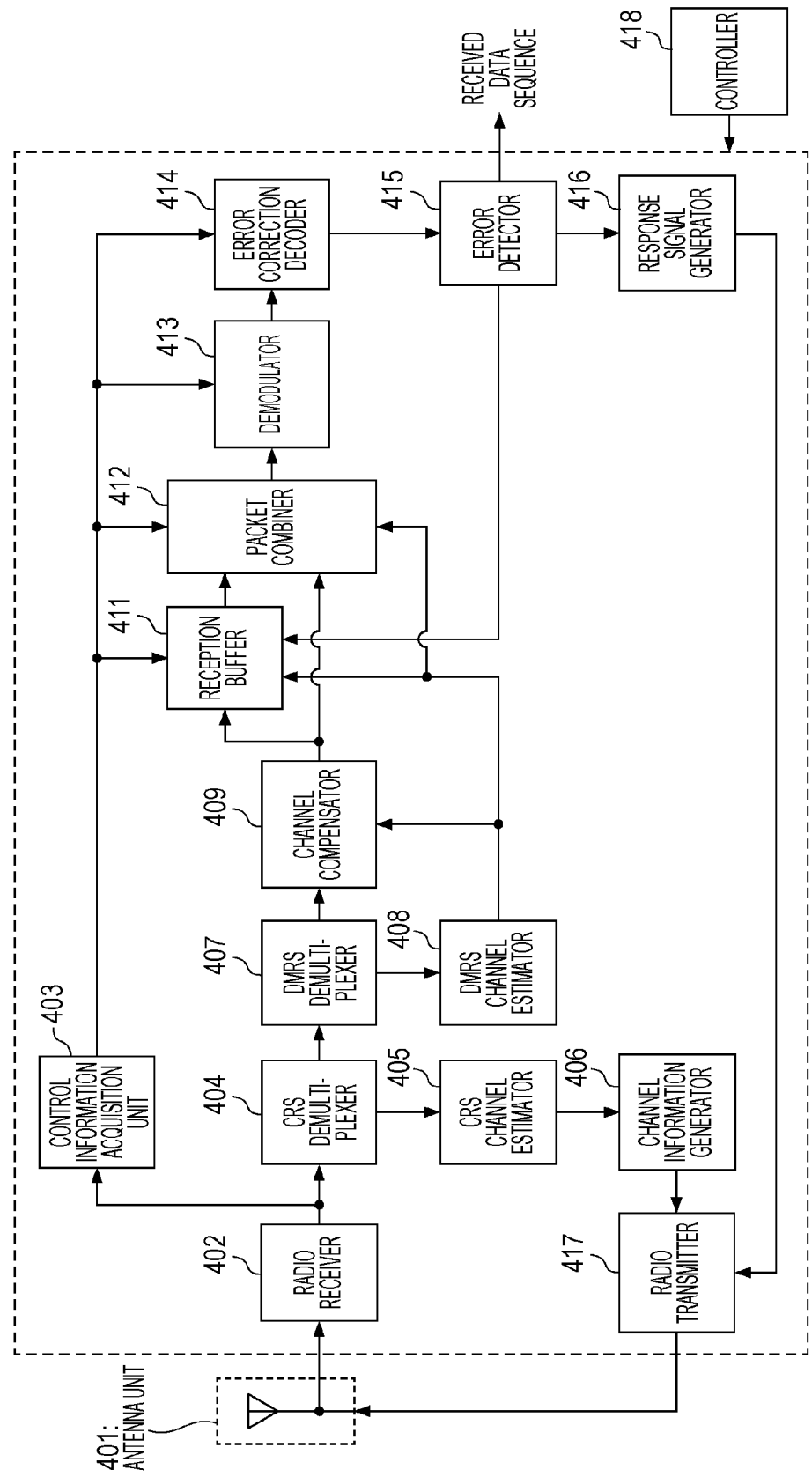
FIG. 4 is a functional block diagram showing one configuration example of a terminal device of the first embodiment of the present invention.

FIG. 4 is a functional block diagram showing one configuration example of the terminal device 400 of the present embodiment. The configuration example of the terminal device 400 of FIG. 4 includes one antenna in an antenna unit 401.

A radio receiver 402 receives a signal from the base station device 100 through the antenna of the antenna unit 401.

A control information acquisition unit 403 acquires, from the received signal which is received by the radio receiver 402, control information including resource allocation, an identification number of a received packet, information representing whether the received packet is of initial transmission or retransmission, the MCS of the received packet, and the number of spatial streams of the own terminal device.

A CRS demultiplexer 404 demultiplexes a CRS from a symbol which is received, inputs the demultiplexed CRS to a CRS channel estimator 405, and inputs the rest of the received symbol to a DMRS demultiplexer 407.

The CRS channel estimator 405 estimates a channel state between each antenna of the base station device 100 and the antenna of the antenna unit of the own terminal device based on the demultiplexed CRS.

A channel information generator 406, based on the channel state estimated at the CRS channel estimator 405, generates channel information for notifying the base station device 100 of it.

The DMRS demultiplexer 407 demultiplexes a DMRS from the received symbol, inputs the demultiplexed DMRS to a DMRS channel estimator 408, and inputs the reset of the received symbol to a channel compensator 409.

The DMRS channel estimator 408 estimates a channel state after precoding by the base station device 100 based on the demultiplexed DMRS, and estimates a received power normalization coefficient g (inverse number of the transmission power normalization coefficient $g^{-1}$ which is multiplied in the precoder 113 of the base station device 100) (hereinafter, an estimation result of the received power normalization coefficient g is also called a channel state estimation result).

Based on the channel state estimation result after precoding in the DMRS channel estimator 408, the channel compensator 409 performs channel compensation (equalization) for the received symbol. Note that, in this processing, the received symbol was multiplied by the inverse number g of the transmission power normalization coefficient $g^{-1}$ which is multiplied in the precoder 113 of the base station device 100 in an equivalent manner.

In a case where an error is detected from the received packet in an error detector 415, a reception buffer 411 (reception storage unit, reception memory unit) stores a channel-compensated received symbol corresponding to this received packet with the identification number of the received packet which is indicated in the control information and the received power normalization coefficient g estimated at the DMRS channel estimator 408. Moreover, in a case where the received packet which is indicated as being the retransmission packet by the control information has no error detected at the error detector 415 (received without error), the reception buffer 411 deletes the received symbol which is stored regarding the packet having the same identification number, and the like. Further, in the case of a received packet which is indicated as being the retransmission packet by the control information, the reception buffer 411 outputs a combination of the received symbol and the received power normalization coefficient g which are stored with the identification number of this received packet to a packet combiner 412. Note that, in a case where the number of times of retransmission is the second time and thereafter, a plurality of combinations of received symbols and the received power normalization coefficient g for initial transmission and all previous retransmission are output.

The packet combiner 412 performs combining of the received symbols based on the control information. Note that, the packet combiner 412 will be described specifically below.

A demodulator 413 applies demodulation to the received symbols output from the packet combiner 412. Note that, in a case where a modulation scheme is specified by the control information, the demodulation is performed based on the modulation scheme.

An error correction decoder 414 performs error correction decoding processing for a demodulated sequence, and generates and outputs a received data sequence. Note that, in a case where a coding rate is specified by the control information, the error correction decoding processing is performed after performing rate matching (depuncture) in accordance with the coding rate.

The error detector 415 detects whether there is an error in the received data sequence based on error detection coding (such as CRC coding) added to the received data sequence (received packet) subjected to error correction decoding, and outputs an error detection result and the received data sequence from which the error detection coding is removed.

A response signal generator 416 generates a response signal for notifying the base station device 100 of the NAK in the case where an error is detected from the received packet in the error detector 415 and the ACK in the case where no error is detected.

A radio transmitter 417 transmits the channel information generated at the channel information generator 406 and the response signal generated at the response signal generator 416 through the antenna of the antenna unit 401 to the base station device 100.

A controller 418 controls each of the aforementioned units to cause each processing to be executed.

Figure 5:
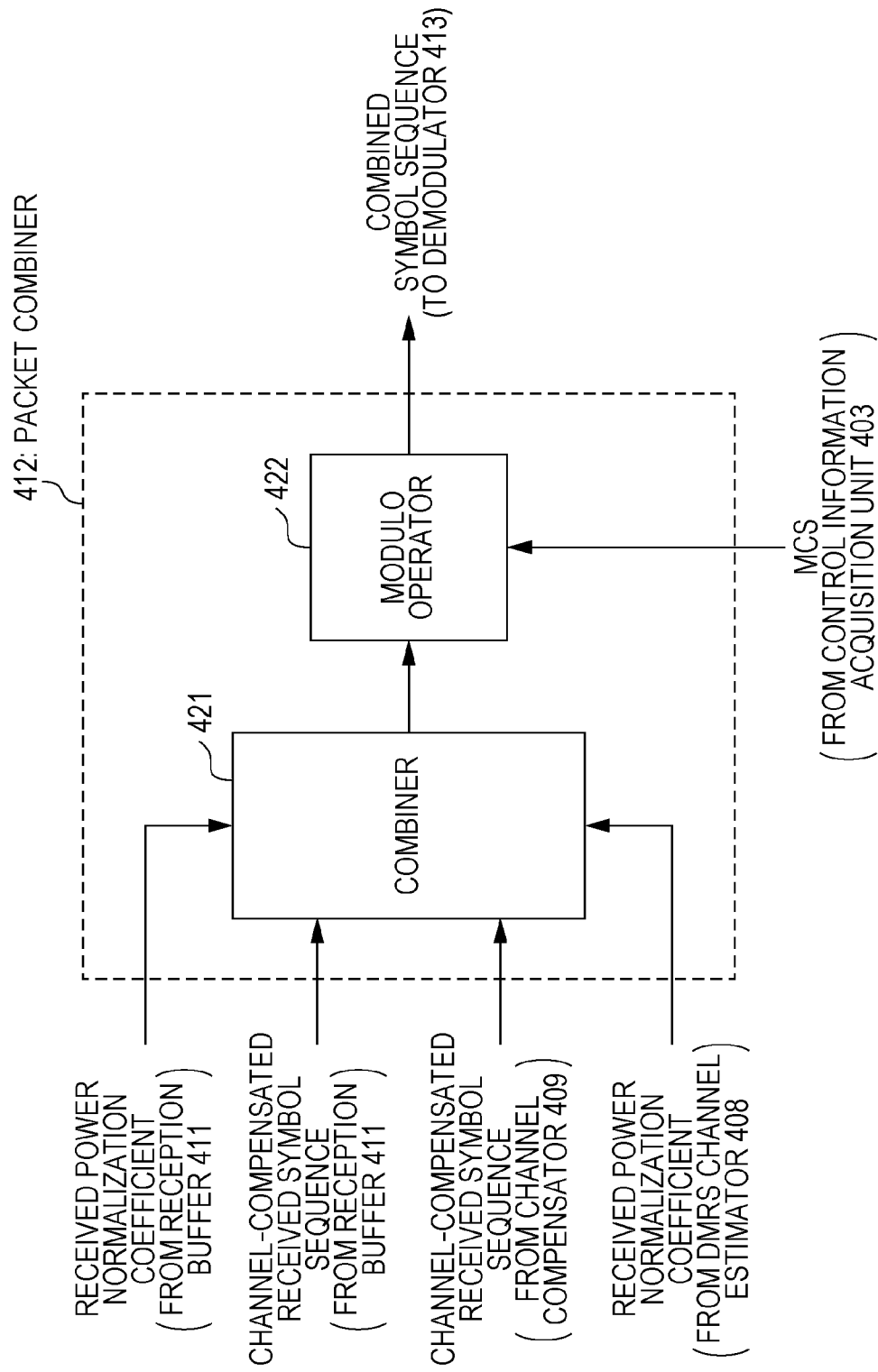
FIG. 5 is a functional block diagram showing one configuration example of a packet combiner in the terminal device of the first embodiment of the present invention.

Next, description will be given for detailed processing in the packet combiner 412. FIG. 5 is a functional block diagram showing one configuration example of the packet combiner 412 in the terminal device 400 of the present embodiment.

In a case where a received packet (latest received packet, hereinafter also called latest packet) is an initial transmission packet, a combiner 421 outputs a channel-compensated received symbol sequence of the latest packet, which is output from the channel compensator 409, as it is as a combined symbol sequence. In a case where the latest packet is a retransmission packet, the combiner 421 combines the channel-compensated received symbol sequence of the latest packet, which is output from the channel compensator 409, and a channel-compensated received symbol sequence of the initial transmission packet of the corresponding packet, which is stored in the reception buffer 411 with the identification number same as that of the latest packet, and further, in a case where the latest packet is the retransmission packet of the second time and thereafter, a channel-compensated received symbol sequence of previous (number of times of retransmission—1) retransmission packets stored in the reception buffer 411, based on a received power normalization coefficient of the latest packet output from the DMRS channel estimator 408 and a received power normalization coefficient of the initial transmission and past retransmission packets output from the reception buffer 411, and outputs the combining result as a combined symbol sequence.

A modulo operator 422 applies modulo operation with a modulo width 2M which is defined according to the modulation scheme corresponding to the MCS output from the control information acquisition unit 403 to the combined symbol sequence output from the combiner 421.

Note that, modulo operation $\text{Mod}_\tau$ with a modulo width $\tau$ with respect to a signal v represented by a complex vector is represented by a formula (10).

[Expression 10]

$$\text{Mod}_\tau(v) = v - \text{floor}\left(\frac{\text{Re}(v)}{\tau} + \frac{1}{2}\right) \cdot \tau - j \cdot \text{floor}\left(\frac{\text{Im}(v)}{\tau} + \frac{1}{2}\right) \cdot \tau \quad (10)$$

Here, j represents an imaginary unit, floor (a) represents a maximum integer which does not exceed a, and Re(v) and Im(v) represent a real part (corresponding to in-phase component of a signal) and an imaginary part (corresponding to quadrature component of a signal), respectively.

Regarding k as the number of times of retransmission in which initial transmission is defined as zero, in a case where a channel (vector) between the M antennas of the base station device 100 and one antenna of the own terminal device 400 (which is set as a u-th user) is set as $h_{u,(k)}$, a received symbol $y_{(k)}$ before channel compensation at the number of times of retransmission k is represented by a formula (11).

[Expression 11]

$$y_{(k)} = h_{u,(k)} x + n_{(k)} = h_{u,(k)}(g_{(k)}^{-1} W_{TX(k)} s') + n_{(k)} = g_{(k)}^{-1} s'_u + n_{(k)} \quad (11)$$

Here, $n_{(k)}$ represents noise, and $W_{TX(k)}$ and $g_{(k)}^{-1}$ represent a transmission filter and a transmission power normalization coefficient at the k-th retransmission, respectively. Accordingly, a channel-compensated received symbol $r_{(k)}$ is as shown in a formula (12).

[Expression 12]

$$r_{(k)} = g_{(k)} y_{(k)} = s_u + 2Mz_u + g_{(k)} n_{(k)} \quad (12)$$

Here, $z_u$ is a perturbation term and has a same value in initial transmission and each retransmission.

In the combiner 421, at the time of K-th retransmission (latest packet), packet combining processing by chase combining is performed with the channel-compensated received symbol $r_{(k)}$ of K-th retransmission (latest packet) and channel-compensated received symbols $r_{(0)}$ to $r_{(K-1)}$ from initial transmission to (K−1)-th retransmission, which are stored in the reception buffer 411. For example, in a case where maximal ratio combining (MRC) is performed, a combining result symbol $r_{MRC}$ is as shown in a formula (13).

[Expression 13]

$$r_{MRC} = \frac{\sum_{k=0}^{K} |g_{(k)}^{-1}| r_{(k)}}{\sum_{i=0}^{K} |g_{(i)}^{-1}|} = s_u + 2Mz_u + \frac{\sum_{k=0}^{K} |g_{(k)}^{-1}| n_{(k)}}{\sum_{i=0}^{K} |g_{(i)}^{-1}|} \quad (13)$$

A received symbol $r_{MRC}'$ obtained by applying modulo operation with the modulo width 2M to this $r_{MRC}$ at the modulo operator 422 is as shown in a formula (14), and the perturbation term $z_u$ is removed by the modulo operation and a desired modulated symbol $s_u$ which is transmitted is able to be detected.

[Expression 14]

$$r_{MRC}' = \mathrm{Mod}_{2M}(r_{MRC}) \quad (14)$$

$$= \mathrm{Mod}_{2M}\left( s_u + 2Mz_u + \frac{\sum_{k=0}^{K} |g_{(k)}^{-1}| n_{(k)}}{\sum_{i=0}^{K} |g_{(i)}^{-1}|} \right)$$

$$= s_u + \mathrm{Mod}_{2M}\left( \frac{\sum_{k=0}^{K} |g_{(k)}^{-1}| n_{(k)}}{\sum_{i=0}^{K} |g_{(i)}^{-1}|} \right)$$

Figure 6:
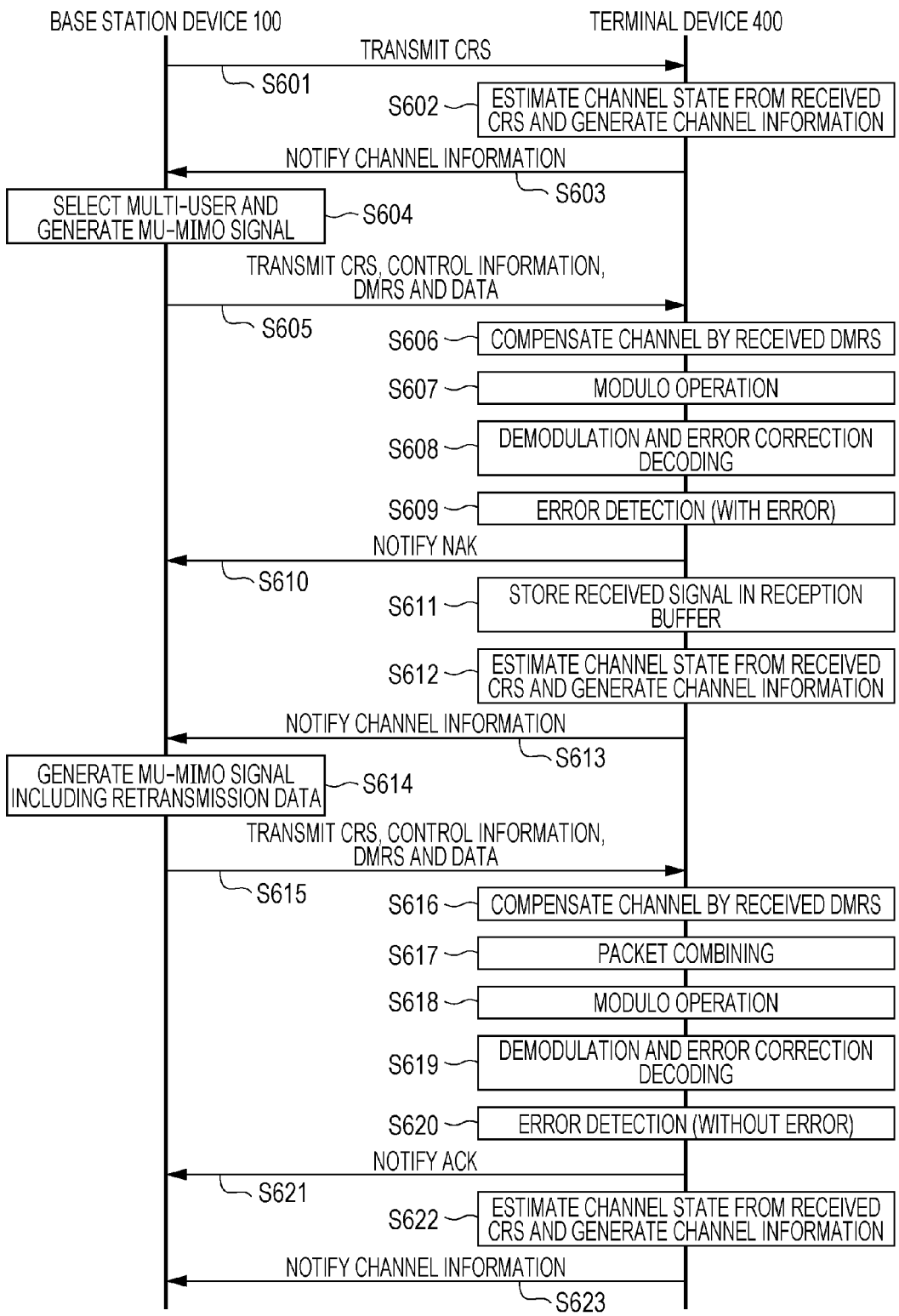
FIG. 6 is a view showing one example of a sequence chart between the base station device and the terminal device of the present embodiment.

FIG. 6 is a view showing one example of a sequence chart between the base station device 100 and the terminal device 400 in a case where MU-MIMO using the non-linear precoding is performed. Note that, shown in FIG. 6 is a sequence chart focusing on one terminal device among a plurality of terminal devices subjected to MU-MIMO.

In FIG. 6, first, the base station device 100 transmits (may broadcast) a CRS for estimating a channel between each antenna 101 of the base station device 100 and the antenna 401 of the terminal device 400 in the terminal device 400 at S601. Note that, in FIG. 6, though first transmission of the CRS is described separately, but it may be inserted periodically in a frame transmitted by the base station device 100 or may be transmitted simultaneously at the time of previous data transmission during continuous communication.

The terminal device 400 estimates a channel state, for example, a complex channel gain between each antenna 101 of the base station device 100 and the antenna 401 of the own terminal device, and generates channel information representing the estimation result (S602) to notify to the base station device 100 (S603).

The base station device 100 selects terminal devices (multi-user) to be subjected to spatial multiplexing with MU-MIMO based on the channel information or the like which is notified from each terminal device 400, performs non-linear precoding based on the channel information for transmission data addressed to each of the selected terminal devices and a DMRS, generates an MU-MIMO signal (S604), and transmits it to each of the terminal devices with the CRS and the control information (S605).

In a case of detecting that data addressed to the own terminal device is included from the received control information, the terminal device 400 performs channel compensation of a received signal based on the received DMRS (S606), and with respect to the channel-compensated received signal (received symbol), after performing modulo operation with a predefined modulo width according to a modulation scheme (S607), performs demodulation and error correction decoding (S608), and further performs error detection (S609). Here, in the case where an error is detected, the NAK is notified to the base station device 100 (S610) as well as the channel-compensated received signal is stored in the reception buffer 411 (S611).

Moreover, channel information representing the channel state which is estimated based on the received CRS is generated (S612) and notified to the base station device 100 (S613). Note that, the notification of the channel information may have procedure of being performed at a timing instructed separately from the base station device 100.

The base station device 100 which has received the NAK from any of the terminal devices 400 generates an MU-MIMO signal including retransmission data for retransmitting a corresponding packet to which the NAK is notified by using the non-linear precoding at a subsequent appropriate timing (S614), and transmits it to each of the terminal devices with the DMRS which is subjected to precoding in the same manner, the CRS and the control information (S615).

In a case of detecting that retransmission data addressed to the own terminal device is included from the received control information, the terminal device 400 performs channel compensation of a received signal based on the received DMRS (S616), and performs packet combining (for example, maximal ratio combining) of the channel-compensated received signal and channel-compensated received signals of corresponding past packets (initial transmission and retransmission packets) stored in the reception buffer by chase combining (S617), and after performing modulo operation with a predefined modulo width for the combining result according to a modulation scheme (S618), performs demodulation and error correction decoding (S619), and further performs error detection (S620). Here, in the case where no error is detected, the ACK is notified to the base station device 100 (S621).

Further, in the same manner as before, channel information representing the channel state which is estimated based on the received CRS is generated (S622) and notified to the base station device 100 (S623). Note that, the notification of the channel information may have procedure of being performed at a timing instructed separately from the base station device 100.

According to the configuration of the present embodiment as has been described above, in the case where HARQ is applied in MU-MIMO transmission using non-linear precoding, the base station device 100 adds a perturbation term same as a perturbation term (perturbation vector) which is added at the time of initial transmission to retransmission packets in the case where retransmission of packets is performed, thus making it possible to remove the perturbation term correctly by modulo operation after performing packet combining of all received symbols which have been received so far in the terminal device 400, and it is possible to obtain a high time diversity gain and realize high transmission characteristics.

Second Embodiment

Description will be given for a communication technology according to the present embodiment by taking the communication system of FIG. 1 as an example in the same manner as the first embodiment. Moreover, description will be given in the present embodiment by taking a case where Tomlinson-Harashima precoding (THP) is used as non-linear precoding as an example.

A configuration of the base station device 100 according to the present embodiment is same as that of the base station device 100 of FIG. 2 of the first embodiment, and a configuration of the precoder 113 is different. Hereinafter, description for same parts as those of the first embodiment will be omitted and description will be given for different parts. Further, a configuration of the terminal device 400 according to the present embodiment is the same as that of the terminal device 400 of FIG. 4 of the first embodiment, so that description thereof will be omitted.

In a case of receiving the NAK from any of the terminal devices 400, the base station device 100 in the present embodiment retransmits a packet, in which an error occurs, addressed to this terminal device. The base station device 100 transmits data of the packet to be retransmitted together with other transmission data addressed to a different terminal device or addressed to the own terminal device by spatial multiplexing transmission with MU-MIMO.

In retransmission of the aforementioned packet, in a case where a processing order in non-linear precoding (THP) at the time of initial transmission is a predefined threshold T or less, a perturbation term same as a perturbation term which has been added to the data at the time of initial transmission is added to retransmission data (symbol), and in a case where the processing order at the time of initial transmission is larger than the threshold T, regardless of the perturbation term which has been added to the data at the time of initial transmission, a suitable perturbation term is calculated again based on other transmission data addressed to the different terminal device or addressed to the own terminal device and channel information, which are made in combination at the time of retransmission, and added to the retransmission data (symbol). Note that, the processing order in the THP represents a spatial multiplexing position in the THP of the data addressed to the corresponding terminal device or an order of sequential IUI subtraction processing in the THP.

Note that, the aforementioned threshold T is preferably set as about half of the number of spatial multiplexing or set as two regardless of the number of spatial multiplexing, but without limitation thereto, may be determined so that error rate characteristic is able to be minimized or through put characteristic is able to be maximized from the order of IUI subtraction processing and average power of IUI which is subtracted in this order in the THP.

Figure 7:
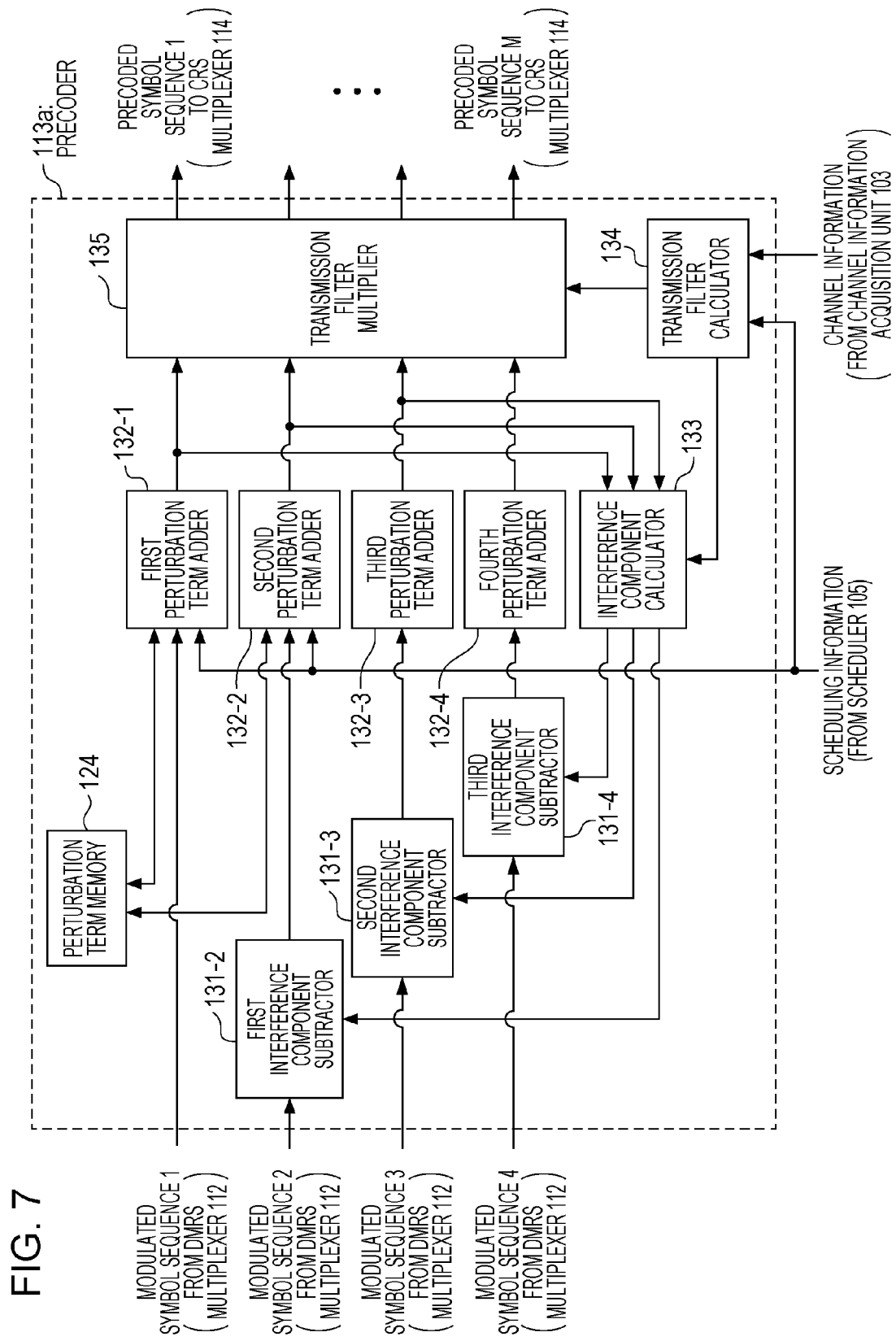
FIG. 7 is a functional block diagram showing one configuration example of a precoder in a base station device of a second embodiment of the present invention.

FIG. 7 is a functional block diagram showing one configuration example of a precoder 113a according to a second embodiment of the present invention. An example of a case where each one transmission data sequence addressed to four terminal devices (U=4) is subjected to spatial multiplexing with MU-MIMO and threshold T=2 is set is shown for the precoder 113a of FIG. 7. Note that, description will be given below that in a case where a packet whose processing order was N-th at the time of initial transmission is retransmitted, it is assigned to the N-th in the same manner also at the time of retransmission, but not limited thereto.

A transmission filter calculator 134 generates a channel matrix H having a complex channel gain between each antenna of the base station device 100 and the antenna of each of the terminal devises 400 as an element based on the CSI which is input from the channel information acquisition unit 103 and notified from each of the terminal device 400 and the scheduling information which is input from the scheduler 105 (such as information of the terminal devices 400 subjected to spatial multiplexing corresponding to modulated symbol sequences 1 to 4 which are input from the DMRS multiplexer 112, information as to whether each of the modulated symbol sequences is of an initial transmission packet or a retransmission packet, and a processing order at the time of initial transmission in the case of a retransmission packet), applies QR decomposition to Hermitian conjugate $H^H$ of the channel matrix H to decompose into a unitary matrix Q and an upper triangular matrix R and further obtain Hermitian conjugate $R^H$ of the upper triangular matrix R (serving as a lower triangular matrix), obtains an interference matrix $B=(\mathrm{diag}R^H)^{-1}R^H-I$ representing a gain of the IUI between the respective terminal devices 400 to output to an interference component calculator 133, and outputs the unitary matrix Q to a transmission filter multiplier 135 as the transmission filter $W_{TX}$. Note that, diagX is a matrix of only a diagonal component of a matrix X, and I represents an identity matrix. Here, an interference matrix B has a form of a formula (15).

[Expression 15]

$$B = \begin{bmatrix} 0 & 0 & 0 & 0 \\ b_{21} & 0 & 0 & 0 \\ b_{31} & b_{32} & 0 & 0 \\ b_{41} & b_{42} & b_{43} & 0 \end{bmatrix} \quad (15)$$

A first perturbation term adder 132-1 adds a perturbation term to the modulated symbol sequence 1 which is output from the DMRS multiplexer 112. The first perturbation term adder 132-1, in a case where the modulated symbol sequence 1 is of a retransmission packet, adds a perturbation term added at the time of initial transmission of this packet, which is stored in the perturbation term memory 124, and in a case where the modulated symbol sequence 1 is of an initial transmission packet, realizes addition of the perturbation term by applying modulo operation with a predefined modulo width according to a modulation scheme of the modulated symbol sequence 1. Note that, since the IUI does not exist in the modulated symbol sequence 1, an interference component subtractor is omitted.

Based on the interference matrix B obtained at the transmission filter calculator 134, the interference component calculator 133 calculates an interference component that a perturbation term addition result for the modulated symbol sequence 1 applies to the modulated symbol sequence 2. Here, an element $b_{21}$ of a second row and a first column of the interference matrix B represents a complex gain of interference imposed by the modulated symbol sequence 1 on the modulated symbol sequence 2, and the interference component is able to be calculated by multiplying this element by the perturbation term addition result for the modulated symbol sequence 1.

A first interference component subtractor 131-2 subtracts the interference component for the modulated symbol sequence 2, which is calculated at the interference component calculator 133, from the modulated symbol sequence 2 which is output from the DMRS multiplexer 112.

A second perturbation term adder 132-2 adds a perturbation term to the modulated symbol sequence 2 from which the interference component has been subtracted. The second perturbation term adder 132-2, in a case where the modulated symbol sequence 2 is of a retransmission packet, adds a perturbation term added at the time of initial transmission of this packet, which is stored in the perturbation term memory 124, and in a case where the modulated symbol sequence 2 is of an initial transmission packet, realizes addition of the perturbation term by applying modulo operation with a predefined modulo width according to a modulation scheme of the modulated symbol sequence 2 from which the interference component has been subtracted. This modulo operation is equivalent to addition of a perturbation term by which a signal point after the modulo operation falls within a region within the modulo width with an origin as a center on a signal plane with respect to the modulated symbol sequence from which the interference component has been subtracted. The same is also applied to modulo operation in third and fourth perturbation term adders below.

The interference component calculator 133 calculates an interference component that the perturbation term addition result for the modulated symbol sequence 1 and a perturbation term addition result for the modulated symbol sequence 2 apply to the modulated symbol sequence 3. Here, an element $b_{31}$ of a third row and the first column of the interference matrix B represents a complex gain of interference imposed by the modulated symbol sequence 1 on the modulated symbol sequence 3 and an element $b_{32}$ of the third row and a second column of the interference matrix B represents a complex gain of interference imposed by the modulated symbol sequence 2 on the modulated symbol sequence 3, and the interference component is able to be calculated by multiplying these elements by the perturbation term addition result for the modulated symbol sequence 1 and the perturbation term addition result for the modulated symbol sequence 2, respectively.

A second interference component subtractor 131-3 subtracts the interference component for the modulated symbol sequence 3, which is calculated at the interference component calculator 133, from the modulated symbol sequence 3 which is output from the DMRS multiplexer 112.

A third perturbation term adder 132-3 realizes addition of a perturbation term by applying modulo operation with a predefined modulo width according to a modulation scheme with respect to the modulated symbol sequence 3 from which the interference component has been subtracted.

The interference component calculator 133 calculates an interference component that the perturbation term addition result for the modulated symbol sequence 1, the perturbation term addition result for the modulated symbol sequence 2 and a perturbation term addition result for the modulated symbol sequence 3 apply to the modulated symbol sequence 4. Here, an element $b_{41}$ of a fourth row and the first column of the interference matrix B represents a complex gain of interference imposed by the modulated symbol sequence 1 on the modulated symbol sequence 4, an element $b_{42}$ of the fourth row and the second column of the interference matrix B represents a complex gain of interference imposed by the modulated symbol sequence 2 on the modulated symbol sequence 4 and an element $b_{43}$ of the fourth row and a third column of the interference matrix B represents a complex gain of interference imposed by the modulated symbol sequence 3 on the modulated symbol sequence 4, and the interference component is able to be calculated by multiplying these elements by the perturbation term addition result for the modulated symbol sequence 1, the perturbation term addition result for the modulated symbol sequence 2, and the perturbation term addition result for the modulated symbol sequence 3, respectively.

A third interference component subtractor 131-4 subtracts the interference component for the modulated symbol sequence 4 which is calculated at the interference component calculator 133 from the modulated symbol sequence 4 which is output from the DMRS multiplexer 112.

A fourth perturbation term adder 132-4 realizes addition of a perturbation term by applying modulo operation with a predefined modulo width according to a modulation scheme with respect to the modulated symbol sequence 4 from which the interference component has been subtracted.

With the perturbation term addition result for the modulated symbol sequence 1 which is output by the first perturbation term adder 132-1, the perturbation term addition result for the modulated symbol sequence 2 which is output by the second perturbation term adder 132-2, the perturbation term addition result for the modulated symbol sequence 3 which is output by the third perturbation term adder 132-3 and a perturbation term addition result for the modulated symbol sequence 4 which is output by the fourth perturbation term adder 132-4 as input, the transmission filter multiplier 135 multiplies them by the unitary matrix Q which is calculated at the transmission filter calculator 134 as the transmission filter $W_{TX}$, and outputs precoded symbol sequences 1 to M to be transmitted from each of the M antennas of the antenna unit 101.

Note that, though description has been given above for a method for realizing the THP with a method for using QR decomposition of a channel matrix as an example, without limitation thereto, a method for sub-optimizing sorting of the terminal devices 400 (modulated symbol sequences 1 to 4) in the THP by using a method of V-BLAST (Vertical Bell Laboratories Layered Space Time) or the like may be used.

Figure 8:
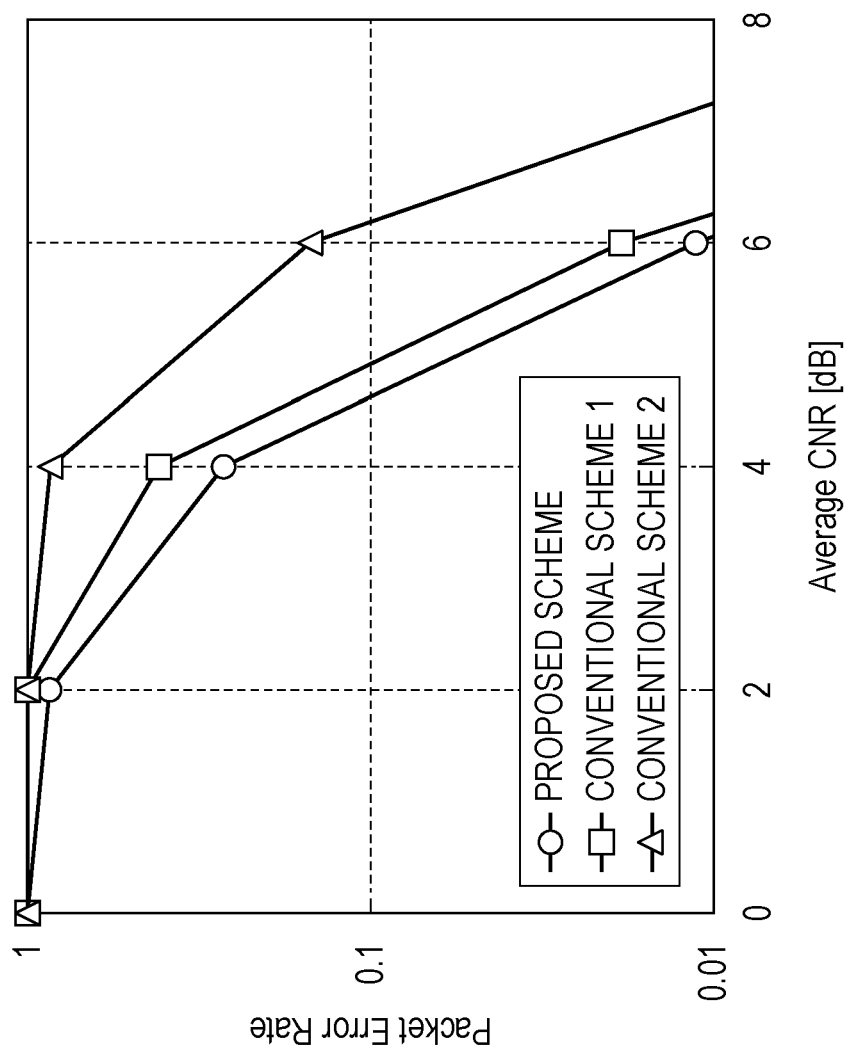
FIG. 8 is a graph showing characteristics of average CNR versus packet error rate when a maximum number of times of retransmission is set as two in a case where MU-MIMO transmission of signals of a modulation scheme QPSK is performed for each one stream by using Tomlinson-Harashima precoding from the base station device including four transmit antennas to four terminal devices each having one receive antenna.

FIG. 8 is a graph showing characteristics of average CNR versus packet error rate (PER) when a maximum number of times of retransmission is set as two in a case where MU-MIMO transmission of signals of a modulation scheme QPSK (Quadrature Phase Shift Keying) is performed for each one stream by using the THP from the base station device 100 including four transmit antennas to the four terminal devices 400 each having one receive antenna.

In FIG. 8, a proposed scheme indicated with circle plots shows a characteristic in a case where threshold T=2 is set in the scheme of the present embodiment described above. On the other hand, a conventional scheme 1 indicated with square plots shows a characteristic in a case where suitable perturbation terms (perturbation vectors) are respectively determined and added independently in an initial transmission packet and respective retransmission packets at the time of transmission of the base station device 100, and modulo operation is performed for each of them at the time of reception of the terminal devices 400 and then maximal ratio combining is performed. Further, a conventional scheme 2 indicated with triangle plots shows a characteristic in a case where suitable perturbation terms (perturbation vectors) are respectively determined and added independently in an initial transmission packet and respective retransmission packets at the time of transmission of the base station device 100, and only a latest packet (of first transmission or retransmission) is selected at all times at the time of reception of the terminal devise 400 for performing demodulation.

In the conventional scheme 1, the respective independent perturbation terms (perturbation vectors) are added to the initial transmission packet and the respective retransmission packets at the time of transmission, and these perturbation terms are desired to be removed individually by modulo operation before combining of the packets, but an error is defined (hard decision) at a stage where modulo operation is executed for a received packet in a state where an symbol decision error due to modulo-loss occurs, so that errors due to modulo-loss are accumulated and a gain by packet combining becomes unable to be attained.

Further, in the conventional scheme 2, since only the latest packet is selected for demodulation at all times, it is not possible to attain a gain by performing maximal ratio combining of a plurality of packets.

Against them, in the proposed scheme according to the present embodiment, a perturbation term same as that of the initial transmission packet is added to the retransmission packets, and modulo operation is performed only once after packet combining at the time of reception and then demodulation and error correction decoding are performed, thus making it possible to reduce influence of errors due to modulo-loss. Further, in the MU-MIMO transmission using the THP, the terminal 400 having a lower processing order of the THP tends to have a greater interference component subtracted by processing of the interference component subtractor. Therefore, in a case where the perturbation term same as one at the time of initial transmission is added at the time of retransmission to the lower terminal device 400, a difference from an optimum perturbation term at the time of retransmission becomes great and the characteristic is likely to be rather degraded. Thus, in the proposed scheme according to the present embodiment, at the time of retransmission of packets for the terminal device 400 having a lower processing order of the THP, a suitable perturbation term is determined and added again at the time of transmission of the base station device 100 regardless of the perturbation term which is added to the initial transmission packet, thus making it possible to reduce degradation of the characteristics in the lower terminal device 400. Note that, in the packet combiner 412 in the terminal device 400 having a lower processing order of the THP, maximal ratio combining processing may be performed after performing modulo operation is performed respectively for the initial transmission packet and the respective retransmission packets.

For the reasons described above, as shown in FIG. 8, the proposed scheme is able to realize more excellent PER characteristic than the conventional scheme 1 and the conventional scheme 2.

Third Embodiment

Description will be given for a communication technology according to the present embodiment by taking the communication system of FIG. 1 as an example in the same manner as the first embodiment.

A configuration of the base station device 100 according to the present embodiment is same as that of the base station device 100 of FIG. 2 of the first embodiment, and the scheduler 105, the error correction encoder 108, the precoder 113 and the control information generator 115 operate differently. Hereinafter, description for same parts as those of the first embodiment will be omitted and description will be given for different parts.

The base station device 100 in the present embodiment notifies each of the terminal devices 400 of information for specifying, in the case of transmitting a packet, a combination of coding bits transmitted with this packet, that is, a coding bit sequence to be transmitted actually among coding bit sequences which are transmission data sequences subjected to error correction coding in the error correction encoder 108 (coding bit sequence after rate matching, which is configured by being selected or repeated from coding bit sequences subjected to error correction coding by rate matching) so as to be included in control information which is generated by the control information generator 115. As this information for specifying the coding bit sequence after rate matching, for example, a redundancy version (RV) is used. Description will be given below by taking a case where the RV is used as the information for specifying the coding bit sequence after rate matching as an example in the present embodiment. A coding bit sequence after rate matching which is subjected to rate matching based on a different RV is generally configured by a mutually different combination of original coding bits.

In the present embodiment, the scheduler 105 selects terminal devices to be multiplexed by MU-MIMO and data or retransmission packets to be transmitted by them based on an amount of transmission data addressed to each terminal device which is accumulated in the transmission buffer 106; QoS information such as priority and allowable delay time; the CSI from each of the terminal devises 400, which is acquired by the channel information acquisition unit 103; the NAK (or retransmission request) acquired by the response signal acquisition unit 104; and the like. Moreover, an identification number is newly applied to an initial transmission packet. Further, parameters such as MCS with respect to the transmission data of initial transmission may be selected based on the CSI from each of the terminal devices 400-1 to 400-4, channel quality information which is acquired separately, or the like. In addition, the scheduler 105 determines the RV which is applied to the transmission packet to output by including in scheduling information with the result above.

The error correction encoder 108 performs error correction coding respectively for each of the transmission data sequences to which the error detection coding is added and which is input from the error detection encoder 107. At this time, the error correction encoder 108 performs rate matching based on the RV included in the scheduling information.

Note that, the retransmission buffer 110 may be configured to store a coding bit sequence before applying rate matching of the transmission data sequences subjected to error correction coding by the error correction encoder 108. In a case where a retransmission packet is transmitted with this configuration, the error correction encoder 108 may read a coding bit sequence of this packet from the retransmission buffer 110, perform only rate matching based on the RV and then output the coding bit sequence after rate matching.

The precoder 113 performs precoding with signal processing same as that of the first embodiment or the second embodiment.

In a case where a target packet is an initial transmission packet, the perturbation vector adder 122 newly calculates a perturbation term which satisfies the formula (8) to add to the coding bit sequence after rate matching. The perturbation term memory 124 stores the perturbation term which is obtained at the perturbation vector adder 122 and information of the RV as a combination. Note that, it may be configured so that the perturbation term and the RV are stored in the retransmission buffer 110 with the modulated symbol sequence or the coding bit sequence of the initial transmission packet.

In a case where the target packet is a retransmission packet, if there is the RV same as that of this packet included in scheduling information among RVs stored in the perturbation term memory 124 correspondingly to this packet, the perturbation vector adder 122 reads the perturbation term which is stored in the perturbation term memory 124 with the RV to add to the coding bit sequence after rate matching. Further, in a case where the target packet is a retransmission packet and there is no RV same as that of this packet included in the scheduling information among RVs stored in the perturbation term memory 124 correspondingly to this packet, the perturbation vector adder 122 newly calculates a perturbation term which satisfies the formula (8) to add to the coding bit sequence after rate matching.

Note that, in a case where the perturbation vector adder 122 reads the perturbation term which is stored in the perturbation term memory 124 with the RV to add to the coding bit sequence after rate matching, in a case where transmission power of this packet extremely increases, the error correction encoder 108 may output the coding bit sequence after rate matching based on the RV different from the RV included in the scheduling information. In this case, the control information generator 115 preferably generates control information including the RV which is actually used by the error correction encoder 108.

The control information generator 115 generates control information including resource assignment, an identification number for identifying packets to be transmitted, information representing whether each packet is of initial transmission or retransmission, the MCS of each packet, the number of spatial streams of each terminal device, and the RV, based on the scheduling information.

A configuration of the terminal device 400 according to the present embodiment is same as that of the terminal device 400 of FIG. 4 of the first embodiment, and the control information acquisition unit 403, the reception buffer 411 and the packet combiner 412 operate differently. Hereinafter, description for same parts as those of the first embodiment will be omitted and description will be given for different parts.

At the time of receiving retransmission packets (latest packets), in a case where there is a packet with the same RV in packets which are received at the time of initial transmission of this packet or previous retransmission, the terminal device 400 in the present embodiment performs modulo operation after performing packet combining of a channel-compensated received symbol of the latest packets and a channel-compensated received symbol of the initial transmission packet or previous retransmission packets (past retransmission packets) having the same RV.

The control information acquisition unit 403 acquires, from the received signal which is received by the radio receiver 402, the control information including resource allocation, an identification number of a received packet, information representing whether the received packet is of initial transmission or retransmission, the MCS of the received packet, the number of spatial streams of the own terminal device, and the RV of the received packet.

In a case where an error is detected from the received packet in the error detector 415, the reception buffer 411 stores a channel-compensated received symbol corresponding to this received packet with the identification number of the received packet which is indicated in the control information, the RV, and the received power normalization coefficient g estimated at the DMRS channel estimator 408. Moreover, in a case where the received packet which is indicated as being the retransmission packet by the control information has no error detected at the error detector 415 (received without error), the reception buffer 411 deletes the received symbol which is stored regarding the packet having the same identification number, and the like. Further, in the case of a received packet which is indicated as being the retransmission packet by the control information, the reception buffer 411 outputs a combination of the received symbol, the RV and the received power normalization coefficient g which are stored with the identification number of the received packet to the packet combiner 412. Note that, in a case where the number of times of retransmission is the second time and thereafter, a plurality of combinations of received symbols for initial transmission and all previous retransmission, the RV and the received power normalization coefficient g are output.

The packet combiner 412 performs combining of the received symbols based on the control information.

In a case where a received packet (latest packet) is an initial transmission packet, the combiner 421 outputs a channel-compensated received symbol sequence of the latest packet, which is output from the channel compensator 409, as it is as a combined symbol sequence. In a case where the latest packet is a retransmission packet, the combiner 421 combines the channel-compensated received symbol sequence of the latest packet, which is output from the channel compensator 409, and a channel-compensated received symbol sequence of the initial transmission packet of this packet and past retransmission packets, which are stored in the reception buffer 411 with the same identification number and the same RV as those of the latest packet, or both of them, based on the received power normalization coefficient of the latest packet, which is output from the DMRS channel estimator 408, and the received power normalization coefficient of the initial transmission packet and past retransmission packets, which are output from the reception buffer 411, or both of them, and outputs the combining result as the combined symbol sequence.

Note that, in a case where a channel-compensated received symbol sequence which is stored with the same identification number and the different RV from those of the latest packet exists in the reception buffer 411, the combiner 421 may couple the channel-compensated received symbol sequence of the latest packet and the channel-compensated received symbol sequence which is stored with the different RV to output as one combined symbol sequence. That is, the combiner 421 may perform packet combining for channel-compensated received symbol sequences having the same RV and perform coupling (inserting in a position of coding bit which is punctured) for channel-compensated received symbol sequences having different RVs, and output the result as a combined symbol sequence.

Moreover, in a case where a channel-compensated received symbol sequence which is stored with the same identification number and the same RV as those of the latest packet and a channel-compensated received symbol sequence which is stored with the same identification number and the different RV exist in the reception buffer 411, first, the combiner 421 may perform the packet combining of channel-compensated received symbol sequences having the same RV, then perform coupling of the channel-compensated received symbol sequences (or combined symbol sequences) having different RVs, and output the result as a combined symbol sequence.

With the configuration of the present embodiment as has been described above, in a case where HARQ is applied in MU-MIMO transmission using non-linear precoding, in a case where the base station device 100 transmits a coding bit sequence after rate matching same as those of an initial transmission packet and past retransmission packets at the time of retransmission of a packet, by adding a perturbation term same as a perturbation term (perturbation vector) which is added, in a case where the same coding bit sequence after rate matching is transmitted, after performing packet combining of the packets of the same coding bit sequence after rate matching among received symbols which have been received so far in the terminal device 400, it becomes possible to remove the perturbation term correctly by modulo operation, and it is possible to obtain a high time diversity gain and realize high transmission characteristics.

A program according to the present invention, which operates in a communication device (base station device and terminal device), may be a program which controls a CPU (Central Processing Unit) and the like (program that causes a computer to function) so as to realize functions of the aforementioned embodiments related to the present invention. In addition, information which is handled by these devices is temporarily accumulated in a RAM (Random Access Memory) at the time of processing thereof, and then stored in various ROMs or an HDD (Hard Disk Drive) such as a flash ROM (Read Only Memory), and is read, modified, and written by the CPU as desired. Moreover, processing of each unit may be performed by recoding the program for realizing functions of each configuration of FIG. 2, FIG. 3 and the like in a computer readable recording medium, and causing a computer system to read this program recorded in the recording medium for execution. Note that, the "computer system" which is referred to here includes an OS and hardware such as peripheral equipment.

Further, the "computer readable recording medium" refers to a portable medium such as a flexible disk, a magneto-optical disk, a ROM or a CD-ROM, or a storage device such as a hard disk installed in the computer system. In addition, the aforementioned program may be one for realizing a part of the functions described above, and further may be one capable of realizing the functions described above in combination with a program which has been already recorded in the computer system. Moreover, a part or all of the communication device in the aforementioned embodiments may be realized typically as an LSI which is an integrated circuit. Each functional block of the communication device may be formed into a chip individually, or a part or all thereof may be integrated and formed into a chip. Further, a method for making into an integrated circuit is not limited to the LSI and a dedicated circuit or a versatile processor may be used for realization. Further, in a case where a technology for making into an integrated circuit in place of the LSI appears with advance of a semiconductor technology, an integrated circuit by this technology may be also used.

As above, the embodiments of this invention have been described in detail with reference to drawings, but specific configurations are not limited to these embodiments, and an invention which has design change and the like which are not departed from the gist of this invention are also included. The present invention is able to be used for a communication device.

REFERENCE SIGNS LIST

100 base station device
101 antenna unit
102 radio receiver
103 channel information acquisition unit
104 response signal acquisition unit
105 scheduler
106 transmission buffer
107 error detection encoder
108 error correction encoder
109 modulator
110 retransmission buffer
111 allocation unit
112 DMRS multiplexer
113, 113a precoder
114 CRS multiplexer
115 control information generator
116 radio transmitter
117 controller
121 transmission filter calculator
122 perturbation vector adder
123 transmission filter multiplier
124 perturbation term memory
131-2 first interference component subtractor
131-3 second interference component subtractor
131-4 third interference component subtractor
132-1 first perturbation term adder
132-2 second perturbation term adder
132-3 third perturbation term adder
132-4 fourth perturbation term adder
133 interference component calculator
134 transmission filter calculator
135 transmission filter multiplier
400 terminal device
401 antenna unit 402 radio receiver
403 control information acquisition unit
404 CRS demultiplexer
405 CRS channel estimator
406 channel information generator
407 DMRS demultiplexer
408 DMRS channel estimator
409 channel compensator
411 reception buffer
412 packet combiner
413 demodulator
414 error correction decoder
415 error detector
416 response signal generator
417 radio transmitter
418 controller
421 combiner
422 modulo operator

The invention claimed is:

1. A transmission device that performs multi-user MIMO transmission for performing spatial multiplexing and transmitting of a plurality of packets addressed to a plurality of reception devices by suppressing inter-user interference with non-linear precoding in advance, comprising:
   perturbation vector adding circuitry that adds a perturbation term to each of modulated symbols of each of the plurality of packets;
   transmission filter calculation circuitry that calculates a transmission filter based on a channel state between the transmission device and the plurality of reception devices; and
   transmission filter multiplication circuitry that multiplies an addition result of the perturbation term by the transmission filter; wherein
   in a case where each of the plurality of packets is an initial transmission packet, the perturbation vector adding circuitry calculates the perturbation term based on the channel state and each of the modulated symbols; and
   in a case where each of the plurality of packets is a retransmission packet, the perturbation vector adding circuitry uses a perturbation term which is added to each of the modulated symbols at the time of initial transmission of each of the plurality of packets as the perturbation term.

2. The transmission device according to claim 1, wherein
   in a case where each of the plurality of packets is a retransmission packet and a processing order in the non-linear precoding is a predefined threshold or less, the perturbation vector adding circuitry uses the perturbation term which is added to each of the modulated symbols at the time of initial transmission of each of the plurality of packets as the perturbation term to be added to each of the modulated symbols of each of the plurality of packets, and
   in a case where each of the plurality of packets is a retransmission packet and the processing order in the non-linear precoding is larger than the predefined threshold, the perturbation vector adding circuitry calculates the perturbation term to be added to each of the modulated symbols of each of the plurality of packets based on the channel state and each of the modulated symbols.

3. A transmission device that performs multi-user MIMO transmission for performing spatial multiplexing and transmitting of a plurality of packets addressed to a plurality of reception devices by suppressing inter-user interference with non-linear precoding in advance, comprising:
   scheduling circuitry that determines a first redundancy version for defining rate matching processing of each of the plurality of packets;
   error correction encoding circuitry that performs error correction coding of transmission data sequences of each of the plurality of packets to generate coding bit sequences, and to perform rate matching processing for the coding bit sequences based on the first redundancy version;
   modulation circuitry that performs modulation for each of the coding bit sequences after the rate matching to generate modulated symbol sequences;
   perturbation vector adding circuitry that adds a perturbation term to each of the modulated symbol sequences;
   transmission filter calculation circuitry that calculates a transmission filter based on a channel state between the transmission device and the plurality of reception devices;
   transmission filter multiplying circuitry that multiplies an addition result of the perturbation term by the transmission filter; and
   control information generation circuitry that generates control information for notifying each of the plurality of reception devices of the first redundancy version, wherein
   in a case where each of the plurality of packets is an initial transmission packet, the perturbation vector adding circuitry calculates the perturbation term based on the channel state and each of the modulated symbol sequences, and
   in a case where each of the plurality of packets is a retransmission packet, the perturbation vector adding circuitry uses a perturbation term which is added to each of the modulated symbol sequences at the time of initial transmission or at the time of past retransmission of each of the plurality of packets which are transmitted with a second redundancy version same as the first redundancy version.

* * * * *